Patented Oct. 21, 1924.

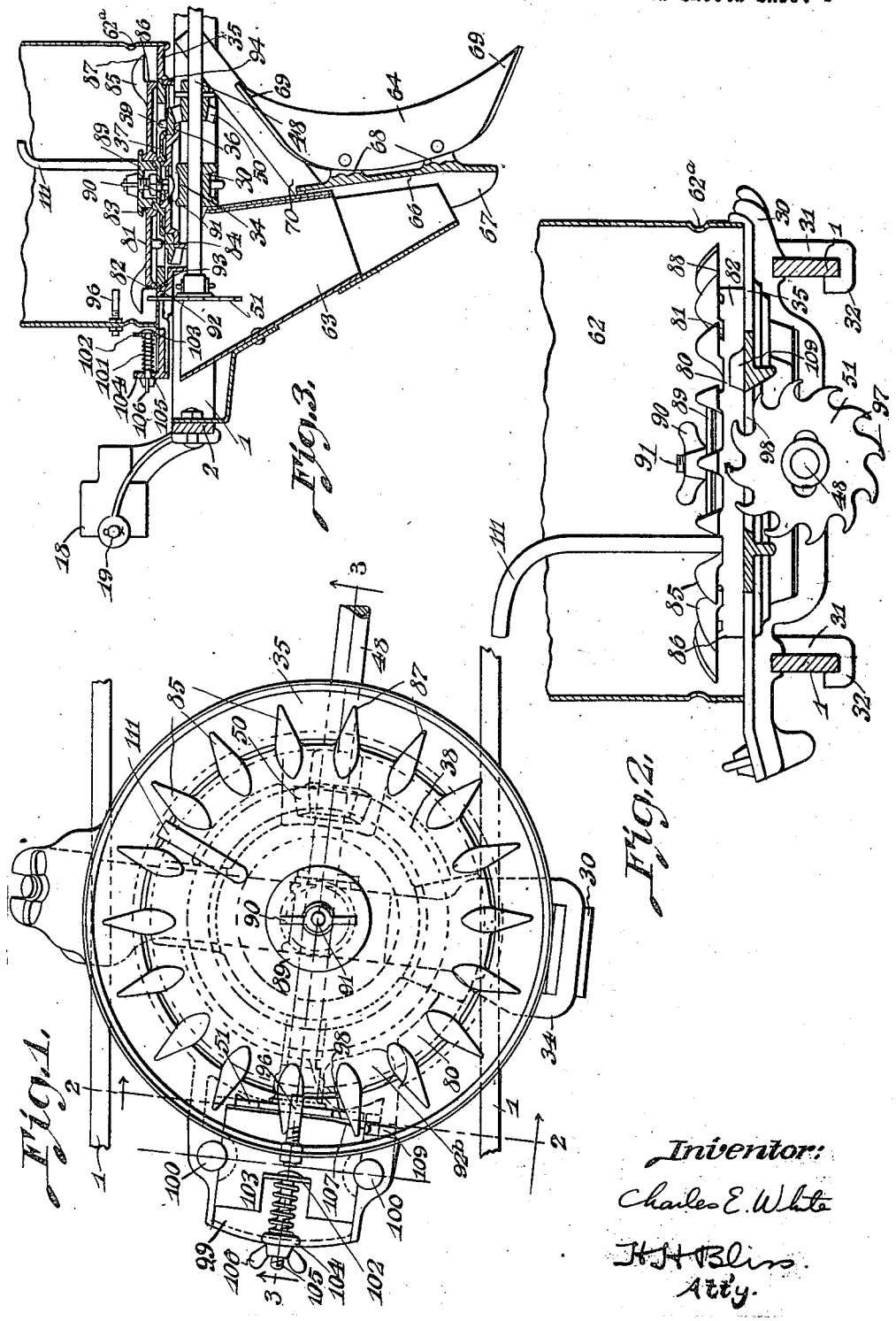

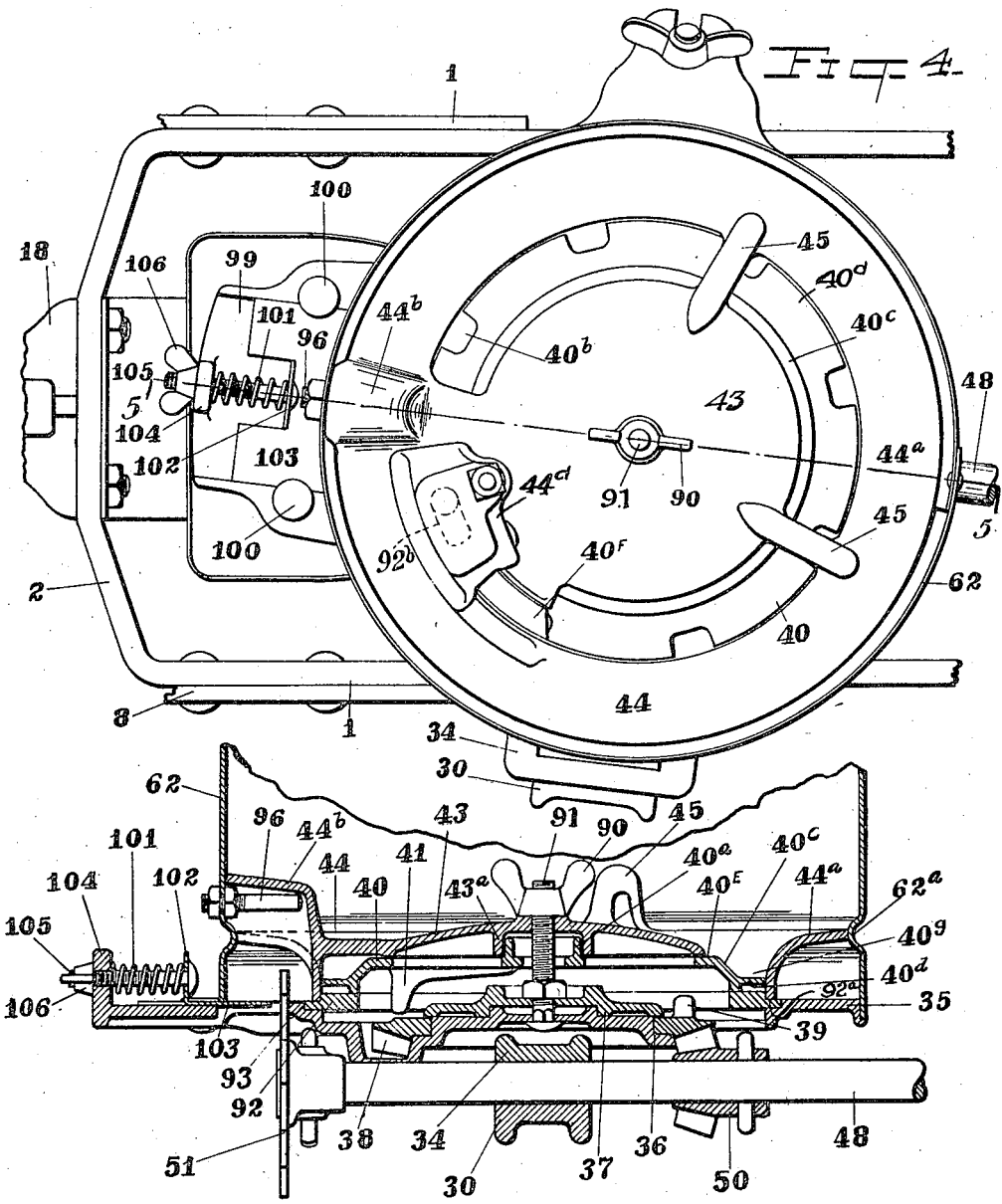

1,512,256

UNITED STATES PATENT OFFICE.

CHARLES E. WHITE, OF MOLINE, ILLINOIS, ASSIGNOR TO DEERE & COMPANY, OF MOLINE, ILLINOIS, A CORPORATION OF ILLINOIS.

PLANTING MECHANISM.

Application filed March 22, 1918. Serial No. 224,057.

*To all whom it may concern:*

Be it known that I, CHARLES E. WHITE, a citizen of the United States, residing at Moline, in the county of Rock Island and State of Illinois, have invented certain new and useful Improvements in Planting Mechanisms, of which the following is a specification, reference being had therein to the accompanying drawing.

This invention relates to improvements in seed-planting implements, particularly improvements in a machine of the class in which each is adapted for use in planting seeds of one sort as corn, and, alternatively for planting seeds of a materially different class as cottonseed.

The object of the invention is to provide a framework and supporting devices of such nature that they will be adapted to combine parts of either of two sets—one intended for planting seeds of one of the sorts referred to, and the other adapted for planting seeds of the other sort.

Fig. 1 is a top plan view of a seed receptacle and delivering mechanism for planting cottonseed.

Fig. 2 is a sectional view on the vertical line 3—3, Fig. 1.

Fig. 3 is a central vertical section on the line 3—3, Fig. 1.

Fig. 4 is a plan view of the receptacle when provided with a corn delivering mechanism.

Fig. 5 is a central section on the line 5—5, Fig. 4.

Figs. 6 and 7 are sectional views of the reversible plate support.

The operative parts of the seeding mechanism may be combined with any suitable framework and may receive power from any suitable driver. As shown a frame is indicated as having side sills 1, 1 and one or more cross arms 2. At 30 a crossbar is positioned at an inclination to the longitudinal lines of the machine. It is detachably secured to the side sills of the main frame by holders 31, these having hooks 32 at the lower ends and threads at their upper ends provided with nuts. 34 is a cap bar secured to bar 30 for holding the driving shaft in place. 35 indicates a base structure carried by or formed with the crossbar 30. At 36 it is shouldered to provide a narrow horizontal wall to support a gear ring 38, and a short vertical wall to center the ring. 37 is a holding plate to hold down the gear ring. 39 are teeth or lugs extending upward from the gear ring to drive the seed plate, the latter having downwardly extending drive lugs 41. The frame 37 is fastened in position by the center pin or bolt 91.

48 indicates a shaft for transmitting power from the prime driver to the gear ring. 50 is a pinion on shaft 48 and meshing with the teeth on the gear ring 38. The shaft extends some distance to the rear of this pinion 50 and carries wheel 51, of peculiar shape, for a purpose to be described.

The seed can 62 in order to attain a number of novel purposes is secured to the devices at its lower end, in a way differing from that followed in fastening the ordinary planter cans or hoppers in position. It is fitted tightly to the base structure 35 and provides, normally, an open cylindrical chamber extending continuously from the plane of its bottom to the plane of its top.

In the open bottom portion of this cylindrical chamber there can be seated either of several interchangeable bottom-closing and seed delivering devices.

Each of these devices comprises a rotary element either plate-like or ring-like in form. For seeds which carry lint-like filaments, such as cottonseed, I provide a delivering plate such as indicated as an entirety, by 80. For seeds which are lintless and have smooth hard surfaces, such as corn kernels, peanuts or the like, I provide a rotating ring-like plate 40.

In either case this seed delivering element (plate or ring) is supported independently of the can or hopper, at the center of the base structure, and is held by vertically positioned centrally arranged fastening devices extending upward from the base structure. For linty seeds such as cottonseed the plate 80 and the parts rotating therewith extend across an area of relatively long diameter, practically from side to side of the bottom of the cylindrical chamber within the can.

The delivering rings or plates for the lintless or smoother seeds are considerably less in diameter and are provided with super-adjacent devices for guiding the seeds inwardly from the outer parts of the can.

As the rotary part of the lintless or smoother seed delivering device should contact with the support below it in a relatively high horizontal plane when used to deliver the smaller sorts of seed, such as kaffir corn, while when delivering larger seed, such as Indian corn, it should contact with its support in a relatively low horizontal plane, I provide a reversible supporting ring 92 by which this may be accomplished.

The delivering plate 80 for cottonseed comprises a flat horizontal part 81 of long diameter and numerous peripheral seed engaging teeth 85, this plate and its teeth being so designed and positioned that there is a body rotating under the entire cylindrical mass of cottonseed. Each of the teeth 85 extends upward and outward, as at 86, and is formed with a point at 87 and a bottom line 88 in a plane somewhat above the horizontal plane of the plate part 81. This seed delivering device 80 is fastened in position by a cap 89, which rests upon the holding plate 37 above referred to. The cap is fastened by a thumb nut 90 engaging with the central threaded pin or bolt 91, rising centrally from and held firmly by the base structure. At the edge of the part 81 there is a downwardly extending peripheral flange 82; at the center there is a flange or hollow boss 83; and at 84 there are drive lugs engaging with the lugs 39 on the gear ring.

The peripheral flange 82 of the device 80 rests upon the ring 92, which is flanged at 93; the flanged part fitting in a rebate 94 in the base structure 35. When supporting the plate 80 the ring 92 may be arranged either as shown in Fig. 6 or as shown in Fig. 7.

For forcing downward one at a time linty seeds, such as are now being considered, the wheel 51, above mentioned, is utilized. As I have found that this wheel must, for delivering seeds singly, be much thinner than those heretofore used and yet so made as to be strong and not liable to rapid wear, I form it of sheet metal.

I have shown the can bottom or hopper bottom and adjuncts, embodying my improvements, in connection with a set of details of specific nature which, although not claiming them as of my invention I briefly refer to in order that my improvements may be understood.

Wheel 51, above specified, on shaft 48, is positioned vertically and has peculiar peripheral teeth 97 arranged to move through opening 98 in the bottom 35. The size of this opening can be varied by gate 103 formed of sheet metal, fitted into rebate 99 and held by pins or rivets 100. 101 is a spring, combined with the gate, it bearing against the lip 102, and against a lug 104, and tending to push it toward the wheel 51. The gate can be drawn outward by nut 106 and screw 105, fitting against lip 102. The edge of plate 103 is inclined as at 107, the inclined edge and the opposing edge at 108 of the aperture in plate 35, adjacent the picker wheel forming a tapered throatway adapted to permit only one linty seed at a time to pass downward.

109 is a lug on plate 35 acting to assist in separating each seed from its neighbor.

111 is an agitating rod carried by the seeding device 80, and 96 is an inwardly extending projection fastened to the can wall and positioned directly above the plane of teeth 85.

The mode of operation of the above described devices when linty seed such as cottonseed is being planted, will be readily understood. If the can be filled with such seed and the machine is moving along the surface of the ground, the power transmitting parts being put into action, the plate 80 with its rotating teeth 85 is rotated under the entire cylindrical mass of cottonseed, and these together with the agitator 111, the seed separating pin 96 and the lug 109 cause the initially-intermatted seeds to come finally, one by one, to the teeth of wheel 51, which engages with them and forces them downward. They are pushed one by one through the aperture in the base structure and dropped to the seed chute or guide 63 and from the latter into the furrow made by the opener 64.

If now it is desired to use the same apparatus (except as to the rotary seed device) for the planting of lintless seeds, with smooth hard surfaces, such as corn kernels or peanuts, it can be readily done without changing the base structure or the can support. The vertically positioned centrally arranged fastening devices at 90 and 91 are separated whereupon the wide seed delivering device 80 is released and can be immediately removed upward through the top of the can together with its holding cap 89.

Then the supporting ring 92 is arranged as in Fig. 6, or as in Fig. 7, depending on the size of the seed to be planted, and the bottom structure is adapted to receive a seed plate of the character of that at 40, which is placed in position, as shown in Fig. 4. This seed plate 40 is in the form of a ring, of an exterior diameter considerably less than that of the bottom part of the can chamber, and having a rather large central opening. But the bottom of the can is closed and devices for centering the rotary plate and holding it down, and for guiding the seed inward to the cells in this plate are provided, the latter consisting of the central element 43 and an outer annular part 44, spaced therefrom to permit the seed to pass between them to the seed plate, both of the elements 43, 44, being adapted to be held in place by vertically disposed centrally arranged fasteners, the same as, or substantially similar to those at 90 and 91, above described. These parts thus specified, namely, the seeding ring or plate 40, and the devices at 43, 44, for closing the bottom of the can and holding the seed ring and the seed guide firmly in place can all be inserted into position by moving them downward through the can and fastening them to the base structure at their centers, that is fastening them to the base structure independently of the can or of any eccentric holding devices.

The central plate holding element or cap plate 43 may be of approximately the same shape as that commonly in use. It should be rigid with the outer annular part 44, and they are preferably cast integral. The outer part comprises an inwardly tapered or curved ring plate $44^a$ and has its inner lower edge fitted snugly against the shoulder $92^a$ of the rebate formed in the edge of the support ring 92 when said ring is arranged as shown in Figs. 5 and 7. The can 62 is formed with a peculiar bead or inwardly projecting annular rib $62^a$ near the bottom of the can by which the internal diameter of the can at the bead is made less than that at any point above said bead, and the outer or peripheral edge of the ring plate $44^a$ is fitted snugly against this bead. By this construction the cover plate as a whole may readily be removed through the top of the can and is not interfered with by any ordinary denting or deformation in the shape of the can which would otherwise interfere with the introduction or removal of the hard seed mechanism. Furthermore, the can thus assists in forming a tight bottom for the seed chamber, and to some extent assists in maintaining the parts 43 and 44 in proper position; but the principal agencies for holding the parts last specified are the vertically disposed centrally arranged holding devices, threaded rod or bolt 91, and the thumb nut 90. These provide a rigid attachment to the central part of the base structure, which binds downward the central holder or cap part 43 and, through the latter, rigidly keeps in proper position the annular seed guiding part 44. Preferably the latter is connected to the central part 43 by integral or rigid bridge arches 45.

Thus these attachments are all held, centrally, by rigid connection with the base structure, independently of the can and of the outer part of the base.

The seed plate or ring 40 is held against vertical displacement and held centrally, though loosely, by the same centrally disposed devices. The plate has a tubular box $40^a$ journaled loosely in a downwardly turned hollow box $43^a$ on the underside of the holder or cap 43. This plate has a lower horizontal flange $40^d$ from which extends inwardly and upwardly the inclined wall $40^c$ and at the top of the latter there is a narrow horizontal flange $40^E$, fitting loosely but snugly under the edge part of the closure and holder or cap element 43. In the lower flange $40^d$ of the seed plate there are single kernel cells $40^b$. The plate or ring 40 has driver lugs 41 which engage with lugs 39 on the gear ring. The outer annular part 44 is swelled upward at $44^b$ to provide a hood or cover for the projection 96, which is permanently secured to the can and is used when linty seeds are being planted. It is also provided with a hood or cover at $44^d$, beneath which are placed a suitable cut-off device $40^F$ and a knockout for the kernels, the latter being positioned immediately over the passageway $92^b$, through which the kernels drop downwardly. And it will be seen that the bottom closing and seed-ring-holding device 43, 44 is so constructed that it tends to guide the seed inwardly from the receptacle walls through the channel at $40^g$, and so as to cover the chamber occupied by the uppermost teeth of the wheel 51, and by the guide web 109, and projection 96.

The operation of the parts last described for delivering smooth surface seeds such as corn kernels will be readily understood. When the machine is moving forward, at the time of planting, the shaft 48 is rotated by suitable driving devices, and this, through the pinion 50, causes the gear ring 38 to revolve. This ring in turn causes the plate or ring 40 to rotate clockwise.

The cells $40^b$ are each filled with a kernel and brought to the drop passage $92^b$ in the plate 92. From the latter it passes through a corresponding opening in the base 35 to the chute 63.

The chute, the furrow-opener and their adjuncts are the same whichever sort of seeds are being planted. The furrow-opener 64 is carried by a holder 66, which projects at 67 some distance below the chute 63. The holder 66 is concavo-convex and is carried by the suspending or bracing arm 70 which extends downward from the main frame. The holder has ears 68 projecting forward to carry the opener 64. The opener is reversible, having similarly tapered portions 69 for the upper and the lower ends. While the apparatus described is more particularly intended for use in planting cotton seed or corn, it may be used for planting any other seeds for which it is adapted, and the claims are to be construed accordingly.

What I claim is:

1. In a planter, a seed carrying and delivering device, having in combination a base structure, a rotary seed plate supported on the base, a holder element above the seed plate and operating to hold the seed plate centered on the base, vertically disposed centrally arranged devices for fastening the holder element to the base structure, and the ring-like device forming a seed guide above the seed plate and held in position rigidly by the aforesaid vertically disposed centrally arranged fastening devices.

2. In a planter, a seed carrying and delivering device, having in combination a base structure, a rotary seed plate detachably supported on the base, a cap-like holder element extending over and covering the central portion of the seed plate, vertically disposed devices arranged centrally relatively to the seed plate and detachably fastening the cap-like element to the base structure, and a ring-like device rigid with the cap element and forming the seed guide above the seed plate and detachably held rigidly in position on the base structure by the aforesaid vertically disposed centrally arranged fastening devices.

3. In a planter, a seed carrying and delivering device, having in combination a base structure, a can fitted to the base, a rotary seed plate detachably supported on the base and means extending over and covering the central portion of the seed plate and operating to hold it in position, said means comprising a central upper stationary element, vertically disposed centrally arranged devices for securing said upper stationary element directly to the base structure, and non-rotary devices rigidly connected to and extending outwardly from said central upper element and detachably engaging with the interior of the can.

4. In a planter, a seed carrying and delivering device, having in combination a base structure, a can fitted to the base, a rotary seed plate supported centrally and detachably on the base, and means extending over and covering the central portion of the seed plate and operating to hold it in position and to guide the seeds thereto, said means comprising a central upper stationary element above the seed plate, vertically disposed fastening devices arranged centrally of the seed plate for securing said upper stationary element directly to the base structure, and non-rotary devices rigid with and extending outward from said upper element, said central upper element and said non-rotary outward extending devices providing a guideway for the seeds above the seed plate, and being detachable independently of the can.

5. In a planter, a seed carrying and delivering device, having in combination the base structure, the can fitted to the base, a relatively small rotary seed plate detachably supported on the base, and the means for partially covering the seed plate for holding it in position and for guiding seeds thereto, said means comprising a central cap-like element which loosely centers the seed plate and holds it against displacement, centrally arranged devices passing vertically through the seed plate for securing said cap-like element to the base structure and non-rotary cap-bracing and seed guiding devices extending outward from the cap-like element and loosely engaging with the interior of the can.

6. In a planter, a seed carrying and delivering mechanism, having in combination the base structure, the can secured thereto, the rotary seed plate on the base at the bottom of the can, and the plate-holding and seed guiding devices removable independently of the can and having a central cap-like element adapted to be secured centrally and rigidly to the base structure by devices passing through the seed plate and to loosely center the seed plate and hold it against displacement.

7. In a planter, a seed carrying and delivering mechanism, having in combination the base structure, the seed can fitted to the base and having an open interior chamber extending from the base structure to the top of the can, the rotary seed plate on the base at the bottom of the can, and the devices for centering the plate and guiding the seed, said devices having a central cap-like element adapted to be positioned centrally and fastened rigidly to the base structure and having outward projecting devices connected therewith which are detachably fitted to the inner wall of the seed can.

8. In a planter, a seed carrying and delivering mechanism, having in combination the base structure, the seed can formed with an inwardly projecting bead, the rotary seed plate on the base structure at the bottom of the can, and means for holding the seed plate in position and guiding the seeds thereto, said means comprising a central plate-holding element secured to the base structure by a holder passing through the seed plate and non-rotary devices extending outward from said plate-holding element and loosely engaging with the said bead, said plate-holding element and non-rotary device being removable independently of the can.

9. In a planter, a seed carrying and delivering mechanism, having in combination a base structure, a can secured to the base structure, a rotary seed plate and a stationary plate-holding and seed guide device, the latter having a non-rotary central cap plate extending over the central portion of the seed plate and a peripheral annular element spaced therefrom and detachably fitted to the interior of the can and secured to the base structure by said cap plate.

10. In a planter, a seed carrying and delivering mechanism, having in combination a base structure, a can secured to the base structure, a rotary seed plate on the base structure, a stationary annular seed guiding element, detachably fitted to the interior of the can and secured to the base structure by vertically arranged devices at the axis of the seed plate, and means connected with said annular element for holding the seed plate in centered position.

11. In a planter, a seed carrying and delivering device, having in combination a base structure with a seed escape passage, a can fitted to the said base, a rotary seed plate, a cutoff above said passage, and bottom-closing and plate-holding devices comprising a central stationary plate, a peripheral can-engaging element spaced from said central plate and detachable therewith from the can while the latter remains in normal position, and means at the axis of the seed plate for securing said peripheral can-engaging element to the base structure, said bottom closing devices being arranged to hold the seed plate centered on the base.

12. In a planter, a seed carrying and delivering mechanism, having a can, a centrally open base structure secured to the can, means at the axis of the can for detachably securing to the base structure a seed discharging plate, for delivering lintless smooth-surfaced seeds, said plate being of relatively small diameter, and a detachable non-rotary plate-holding and seed-guiding device, adapted to cover the bottom peripheral part of the chamber in the can, and to hold the seed plate centered on the base and guide the seed inward from the outer portion of the can to said plate.

13. In a combined corn and cotton planter, a seed carrying and delivering mechanism having in combination a base plate provided with a passage relatively near the center for the delivery of corn and a passage at greater distance from the center for the delivery of cotton, the can fitted to the said base and normally enclosing a chamber of substantially uniform width extending from the base plate to the top of the can, a relatively wide seed plate extending from side to side of the can and fitted on the base plate and positioned to permit cottonseed to pass through the outer of said passages and to prevent it from passing through the inner passage, vertically disposed centrally arranged fastening devices extending upward from the base plate to retain said seed plate in position, said can, base and central fastening device being adapted, when the relatively large wheel is detached, to have fitted thereto a relatively small corn-delivering plate with a superposed plate-holder and seed-guide and means adapted to be operatively connected with either of said seed plates alone, for driving the same.

14. In a combined corn and cotton planter, a seed carrying and delivering mechanism comprising a base plate, a can secured thereto, said base plate having a vertical passage adjacent to its periphery for the discharge of cotton seed, a vertically-positioned wheel for delivering cotton seed and projecting through said passage, a vertical passage in said base plate for the discharge of corn, said base plate being adapted to detachably support independently of the can, either a relatively large rotary cotton seed plate extending across the lower portion of the can over said corn discharge passage and adapted to deliver seed to the said vertically-positioned wheel or a relatively small corn delivering plate, together with a plate retainer and seed guide extending from side to side of the can and over said vertically-positioned wheel and centrally arranged fastening means for holding either of said delivering plates alone on the base plate.

15. A convertible corn and cotton planter comprising a suitable base having openings for the discharge of cotton seed and corn, respectively, a seed receptacle mounted on said base, a seed plate rotating device under said receptacle and adapted to be operatively connected either with a delivering plate for cotton seed supported by the base and extending over the corn discharge opening or with a corn seed plate, centrally disposed means for holding either of said plates alone in position on the base, and a cover plate adapted to be detachably secured to said base to cover the cotton seed discharge opening.

16. A convertible corn and cotton planter comprising a suitable base having openings for the discharge of cotton seed and corn, respectively, a seed receptacle mounted on said base, a seed plate rotating device under said receptacle and adapted to be operatively connected either with a delivering plate for cotton seed supported by the base and extending over the corn discharge opening or with a corn seed plate, rotating means extending into said seed receptacle at the cotton discharge opening and adapted to withdraw the cotton seed from said receptacle, centrally disposed means for holding either of said plates alone in position on the base, and a cover plate adapted to be detachably secured to said base to cover the cotton seed discharge opening and said rotating means.

17. A convertible corn and cotton planter comprising a suitable base having openings for the discharge of cotton seed and corn, respectively, a seed receptacle mounted on said base, a seed plate rotating device under said receptacle and adapted to be operatively connected either with a delivering plate for cotton seed supported by the base and extending over the corn discharge opening, or with a corn seed plate, means adapted to withdraw the cotton seed from said receptacle, means independent of the corn seed plate for holding the cotton seed plate in position on the base, and a cover plate adapted to be detachably secured to said base to cover the cotton seed discharge opening and said vertically-positioned wheel.

18. A convertible corn and cotton planter comprising a suitable base having openings for the discharge of cotton seed and corn, respectively, a seed receptacle mounted on said base, a seed plate rotating device adapted to be operatively connected either with a delivering plate for cotton seed supported by the base and extending over the corn discharge opening, or with a corn delivering plate, means independent of the corn delivering plate for holding the cotton seed delivering plate in position on the base, and a cover plate adapted to be detachably secured to the base to cover the cotton seed discharge opening and serving to hold the corn delivering plate in position on the base.

19. In a planter, a seed carrying and delivering device having in combination a base structure, a seed receptacle mounted on said base, a rotary seed plate supported on the base, a holder element above the seed plate, a ring-like device forming a seed guide above the seed plate, and means independent of the seed receptacle for detachably securing said holder element to the base.

20. In a convertible planter, the combination with seed delivery devices, of a cam adapted to contain the seed and having discharge openings for different kinds of seed, an annular member projecting inwardly from the lower portion of the wall of the can, the internal diameter of said member being less than that of any portion of the can above it, and a removable cover plate adapted to fit within said annular member.

21. In a convertible planter, the combination with seed delivery devices, of a can adapted to contain the seed and having discharge openings for different kinds of seed, a bead projecting inwardly from the lower portion of the wall of the can, the internal diameter of the can at said bead being less than that at any portion of the can above it, and a removable cover plate adapted to fit within said bead.

22. In a planter, a seed carrying and delivering device comprising in combination, a base, a rotary seed plate, means interposed between said seed plate and the base and adjustable to vary the height of the seed plate relatively to the base, a cut-off device cooperating with the seed plate, and means for rotating the seed plate.

23. In a planter, a seed carrying and delivering device comprising in combination, a base, an annular member supported by the base, a rotary seed delivering plate supported by and bearing on the upper surface of said annular member, the latter member being reversible to vary the height of the seed plate relatively to the base, a cut-off device cooperating with the seed plate, and means for rotating the seed plate.

24. In a planter, a seed carrying and delivering device comprising in combination, a rebated base, an annular member having a marginal flange adapted to fit in the rebate of the base, said member being reversible to vary the height of its upper surface relatively to the base, a rotary seed delivering plate supported by and bearing on the upper surface of said member, a cut-off device cooperating with the seed plate, and means for rotating the seed plate.

In testimony whereof, I affix my signature.

CHARLES E. WHITE.